United States Patent
Dudar

(10) Patent No.: US 9,834,205 B1
(45) Date of Patent: Dec. 5, 2017

(54) HYBRID VEHICLE EVAPORATION SYSTEMS

(71) Applicant: Ford Global Technologies, LLC, Dearborn, MI (US)

(72) Inventor: Aed M. Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/357,219

(22) Filed: Nov. 21, 2016

(51) Int. Cl.
| B60K 15/03 | (2006.01) |
| B60W 20/50 | (2016.01) |
| B60K 6/22 | (2007.10) |
| B60K 15/035 | (2006.01) |
| B60K 15/05 | (2006.01) |

(52) U.S. Cl.
CPC ............... B60W 20/50 (2013.01); B60K 6/22 (2013.01); B60K 15/03504 (2013.01); B60K 15/05 (2013.01); B60K 2015/03217 (2013.01); B60K 2015/03514 (2013.01); B60K 2015/0561 (2013.01); B60W 2560/02 (2013.01)

(58) Field of Classification Search
CPC ................ B60W 2560/05; B60K 2015/03328
See application file for complete search history.

(56) References Cited

U.S. PATENT DOCUMENTS

| 8,028,780 B2* | 10/2011 | Sagawa | B60K 15/05 180/65.27 |
| 8,122,984 B2* | 2/2012 | Miwa | B60K 1/04 180/65.27 |
| 9,216,646 B2 | 12/2015 | Yang et al. | |
| 9,643,488 B2* | 5/2017 | Seong | B60K 15/05 |
| 2012/0049565 A1 | 3/2012 | Saito | |
| 2014/0152255 A1 | 6/2014 | Lovett et al. | |
| 2017/0167909 A1* | 6/2017 | Dudar | G01F 23/18 |

* cited by examiner

Primary Examiner — Brian Swenson
(74) Attorney, Agent, or Firm — David Kelley; Brooks Kushman, P.C.

(57) ABSTRACT

A hybrid vehicle evaporation system may include a fuel tank having a fuel level sensor, a refuel button, and a controller. The controller may be programmed to disable HV charging in response to a selection of the refuel button, monitor a fuel level received from the fuel level sensor, and enable HV charging in response to the fuel level failing to increase for a predetermined amount of time.

13 Claims, 3 Drawing Sheets

HYBRID VEHICLE EVAPORATION SYSTEMS

TECHNICAL FIELD

Disclosed herein are hybrid vehicle evaporation systems.

BACKGROUND

Hybrid Electric Vehicles (HEV) may operate on battery power as well as fuel power. In some situations, charging of the battery may be interrupted in order to refuel the vehicle.

SUMMARY

A hybrid vehicle evaporation system may include a fuel tank having a fuel level sensor, a refuel button, and a controller. The controller may be programmed to disable HV charging in response to a selection of the refuel button, monitor a fuel level received from the fuel level sensor, and enable HV charging in response to the fuel level failing to increase for a predetermined amount of time following the selection.

A hybrid vehicle may include a charging system, a fuel tank having a fuel level sensor, and a controller. The controller may be programmed to disable the charging system in response to receipt of a refueling indicator, monitor a fuel level received from the fuel level sensor, and enable the charging system in response to the fuel level failing to increase for a predetermined amount of time following the receipt of the refueling indicator.

A method may include receiving a selection of a refuel button, monitoring a fuel level received from a fuel level sensor within a fuel tank, and enabling the charging system in response to the fuel level failing to increase for a predetermined amount of time following the selection.

DETAILED DESCRIPTION

Figure 1:
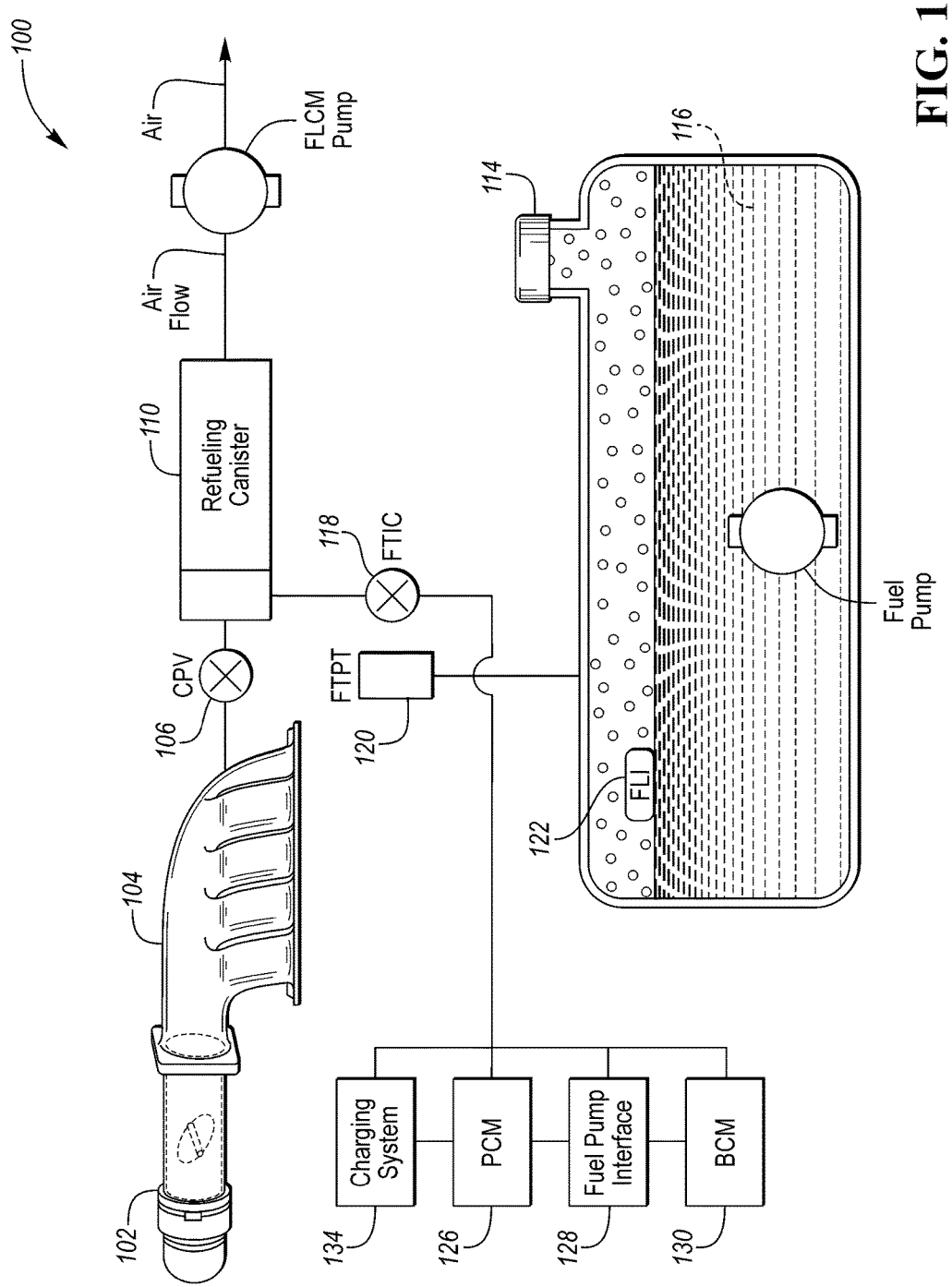
FIG. 1 illustrates an example hybrid electric vehicle (HEV) evaporation system.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Hybrid vehicles (HV) may include a battery as well as a fuel tank. The battery may be recharged at various charging stations. Due to customer demands, on demand refueling has been becoming increasingly popular. Instead of conventional refueling by driving the vehicle to a gas station, vehicles carrying gas may approach a parked vehicle to re-fuel that vehicle while the owner/driver is away. However, these parked vehicles may be parked at HV charging stations and may be currently charging when the gas vehicle approaches. This charging may be via a tethered cable or inductive charge pad. On-demand re-fuel may not occur during HV charging in order to avoid certain hazards created by fuel vapors being in the vicinity of high voltages. Moreover, the service person responsible for re-fueling the vehicle may not be able to know whether HV charging is taking place or not.

Accordingly, the system disclosed herein may provide for a vehicle to be re-fueled when a vehicle is connected to or parked at an HV charging station by suspending vehicle charging during the re-fueling. This may be very beneficial for on-demand fueling, which is becoming increasingly popular. HEV vehicles have fuel tanks that are sealed by FTIV valves. To refuel, the tank must be depressurized. To prepare a hybrid vehicle for refueling, the driver may select a refuel button. HV charging may be suspended in response to this selection. Further, the FTIV valve may be opened allowing vapor from the fuel tank to be captured inside a canister. Further, upon receiving a request to depressurize the fuel tank, the system may suspend HV battery charging.

Once the tank pressure is zero, the fuel cap door may be unlocked to facilitate fueling. The on-demand service person may fill up the car, and during which the fuel level may increase over time. When the requested fuel amount is dispenses, the on-demand fuel service person may close the fuel door. This may signal that the fueling is complete and the FTIV may be closed, thus trapping vapors inside the fuel tank. HV charging may then resume. However, if the fuel level does not increase over a predefined amount of time, it may become apparent that the vehicle is not being re-fueled. This may be due to the refueling button being accidentally pressed. If HV charging is suspended, the driver may return to a vehicle that has not been charged.

The system may prevent this from happening by resuming HV charging upon failing to recognize an increase in the fuel level over a predefined amount of time.

FIG. 1 illustrates an example hybrid electric vehicle (HEV) evaporation system 100. The evaporation system 100 may include a throttle 102 and an air intake manifold 104 in communication with a compression valve 106 configured to allow the hot air flow from the intake manifold 104 to pass through to a refueling canister 110.

Various requirements exist for evaporation system components with respect to the amount of fuel vapors entering the atmosphere form an HEV system. A fuel tank 116 may be sealed via a fuel door 114. The fuel tank 116 may vent fuel vapors to the canister 110 through a fuel tank isolation valve (FTIV) 118. The FTIV 118 may control the fuel tank pressure to prevent evaporation and pressure increases within the fuel tank 116. A fuel tank pressure (FTPT) sensor 120 may be mounted on or inside the fuel tank 116 and may detect a fuel tank pressure.

The fuel tank 116 may include a fuel level sensor 122, or fuel level indicator (FLI). The fuel level sensor 122 may recognize a fuel level of the fuel within the fuel tank 116. The fuel level sensor 122 may be a float mechanism in combination with a potentiometer. As the tank empties, the float may slide lower along the resistor, increasing the resistance. The converse is true as the tank is filled. During fueling, the fuel level sensor 122 may indicate an increase in fuel level.

A re-fuel button 128 may be a physical button arranged within the vehicle, typically near a driver's seat, and may be pressed by a user to indicate that refueling may take place. In addition to being a physical switch, the button 128 may be arranged on a display unit or heads-up-display within the vehicle. The button 128 may also be presented via a display of a mobile device such as a driver's cellular phone, tablet computer, etc. Prior to refueling, the driver or user may select the re-fuel button 128. This may prepare the tank (e.g., depressurize the fuel tank 116) prior to refueling. This is discussed in more detail herein.

The re-fuel button 128 may be in communication with at least one of a body control module (BCM) 130 and a power control module (PCM) 126. The BCM 130 may remain on in a lower power mode regardless of whether the vehicle is in use. Thus, if the vehicle is keyed-off, the BCM 130 may operate in the lower power mode. If the re-fuel button 128 is selected during key-off, the BCM 130 may receive an indication of the selection and in turn transmit instructions to the PCM 126 to awaken the PCM 126.

The power control module (PCM) 126 may be in communication with various elements of the evaporation system 100, such as the FTPT sensor 120, the fuel level sensor 122, as well as the compression valve 106 and the FTIV 118. The PCM 126 may transmit instructions to the elements such as the compression valve 106 and FTIV 118. The PCM 126 may also receive data from the fuel level sensor 122 and the FTPT sensor 120.

The PCM 126 may instruct the FTPT sensor 120 to depressurize the fuel tank 116 in response to receiving a selection of the re-fuel button 128. Upon receiving such a selection, the PCM 126 may also suspend any HV battery charging. The PCM 126 may monitor the fuel level and the fuel tank pressure. Once the PCM 126 receives an indication from the FTPT sensor 120 that the fuel tank pressure is zero, the PCM 126 may transmit instructions to unlock the fuel door 114. Thus, refueling may begin.

During refueling, the fuel level supplied by the fuel level sensor 122 may increase over time. Once refueling is complete, the fuel door 114 may be closed.

The PCM 126 may receive data from the FTPT sensor 120 that the fuel tank pressure is increasing, thus indicating that the fuel door 114 has been shut and that refueling is over. The FTIV 118 is then closed and refueling vapors are trapped inside the fuel tank. In response to the FTIV closing, the PCM 126 may enable HV charging to resume.

If the fuel level does not increase over time, then the PCM 126 may assume that the re-fuel button was accidentally selected. The PCM 126 may monitor the fuel level for a predefined amount of time and, if the fuel level does not change, the PCM 126 may enable HV charging to resume.

A charging system 134 may be in communication with the PCM 124. Additionally or alternatively, the charging system 134 may be in communication with the BCM 130. The charging system 134 may include a battery electric control module (BECM) and charging components for charging the vehicle battery (not individually shown.) In one example, the charging system 134 may include a tethered charging cord to delivery power to the battery from an external source. The charging system 134 may also include a coil for inductive charging.

Both the PCM 126 and the BCM 130 may be a computer including a controller and a processor configured to perform the processes disclosed herein via control logic. The PCM 126 and the BCM 130 may be coupled to a memory or database (not shown). The PCM 126 and the BCM 130, and/or memory thereof, may produce and maintain instructions, parameters, values, thresholds, etc. Further, the vehicle may be any hybrid vehicle including a plug-in hybrid vehicle (PHEV).

Figure 2:
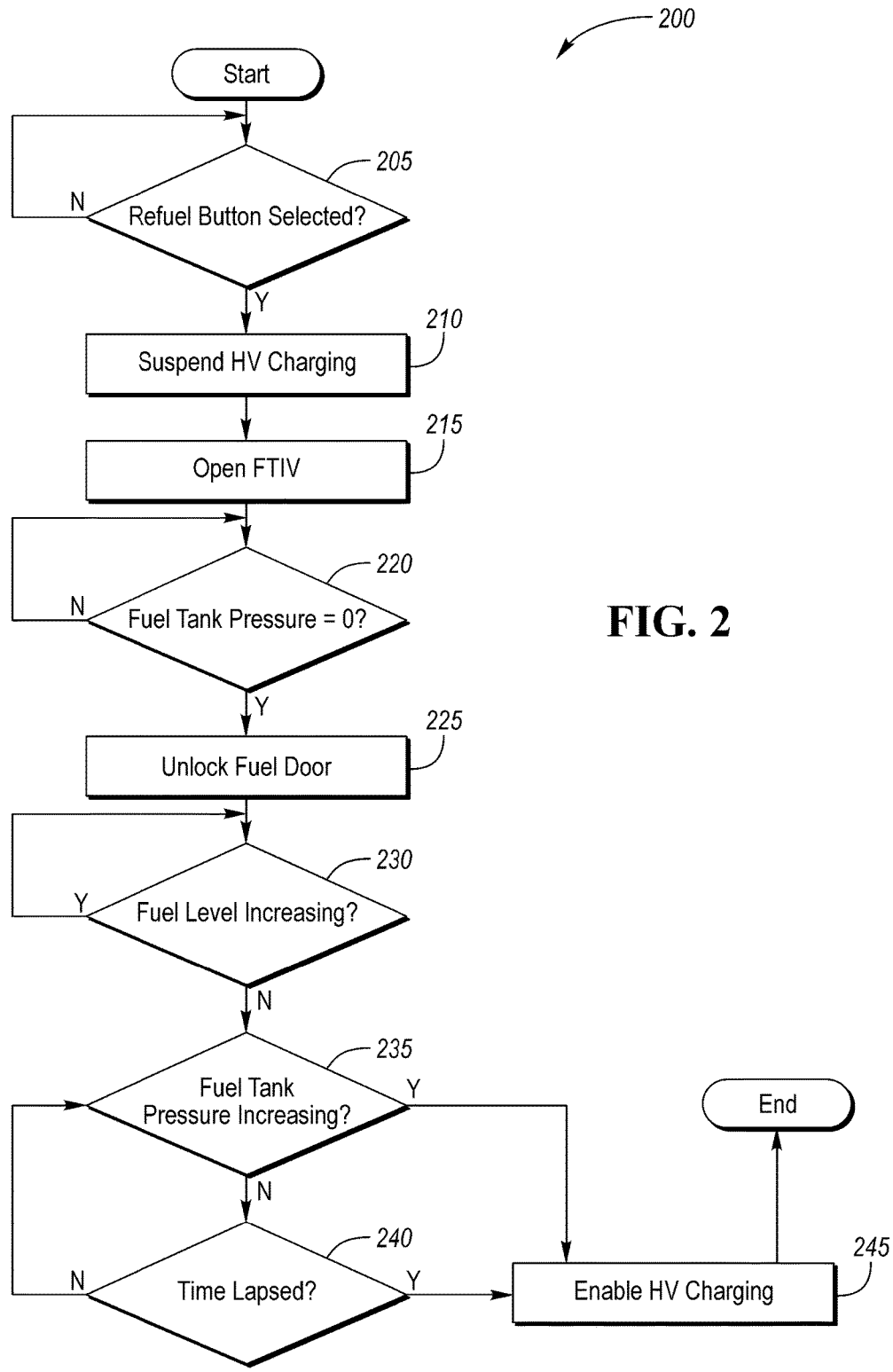
FIG. 2 illustrates an example process for the system.

FIG. 2 is an example flow chart for a process 200 of the system 100. Specifically, the process 200 may identify an erroneous selection of the refuel button 128.

The process 200 may begin at block 205 where the PCM 126 may wait to receive an indication that the refuel button 128 has been selected. Once the refuel button 128 has been selected, the process proceeds to block 210.

At block 210, the PCM 126 may instruct the charging system 134 to suspend any HV charging.

At block 215, the PCM 126 may instruct the FTIV 118 to open in order to depressurize the fuel tank 116.

At block 220, the PCM 126 may recognize whether the fuel tank pressure is at zero or nearly zero. The fuel tank pressure may be received from the FTPT sensor 120. A zero pressure reading may indicate that the fuel tank 116 has been depressurized. Once the fuel tank pressure is zero, the process 200 may proceed to block 225.

At block 225, the PCM 126 may instruct the fuel door 114 to unlock. This allows a user or service person to gain access to the fuel tank 116 for refueling.

At block 230, the PCM 126 may monitor the fuel level of the fuel tank 116 provided by the fuel level sensor 122. The PCM 126 may monitor the fuel level over time. For example, if the fuel level increases between a first reading and a subsequent reading, the fuel level may be determined to be increasing. If, however, the first reading and subsequent reading are substantially similar, the fuel level may not be increasing. The PCM 126 may monitor the fuel level every two seconds. In one example, the fuel level may never increase. In this example, the refuel button 128 may have been accidentally selected or bumped. In another example, the fuel level may increase during refueling, and then cease to increase once refueling is complete. If and when the fuel level ceases to increase over time, the process 200 will proceed to block 235.

At block 235, the PCM 126 may monitor the fuel tank pressure provided by the FTPT sensor 120. An increase fuel pressure may indicate that the fuel door 114 has been closed and that refueling is complete. The PCM 126 may monitor the fuel pressure over time. For example, if the fuel pressure increases between a first reading and a subsequent reading, the fuel pressure may be determined to be increasing. If, however, the first reading and subsequent reading are substantially similar, the fuel pressure may not be increasing. This may indicate that the fuel door 114 remains open. If the fuel pressure fails to increase, the process 200 proceeds to block 240. If the fuel pressure does increase, the process 200 may end.

At block 240, the PCM 126 may determine whether a predetermined time since the fuel door has been unlocked has lapsed. That is, has the fuel tank pressure failed to increase (e.g., give a non-zero reading) for the predetermined time. The predetermined time may be a time that would allow a user or service person to initiate refueling, but not a long enough time to hinder vehicle re-charging unduly. In one example, the predetermined time may be approximately 3 minutes. This is an example time, and longer or shorter times may be used by the PCM 126.

The PCM 126 may monitor the fuel tank pressure until it either increases, or fails to increase for the predetermined amount of time. Once the fuel tank pressure fails to increase for the predetermined amount of time, the process 200 may proceed to block 245.

At block 245, the PCM 126 may instruct the charging system 134 to permit HV charging. Since the fuel level and the fuel tank pressure indicate that refueling is not current occurring, the PCM 126 may permit the charging system 134 to charge the vehicle battery. The process 200 may then end.

While process 200 is described as being performed by the PCM 126, the process 200 may be performed by another control unit or processor either embodied within the vehicle or remote from the vehicle.

Figure 3:
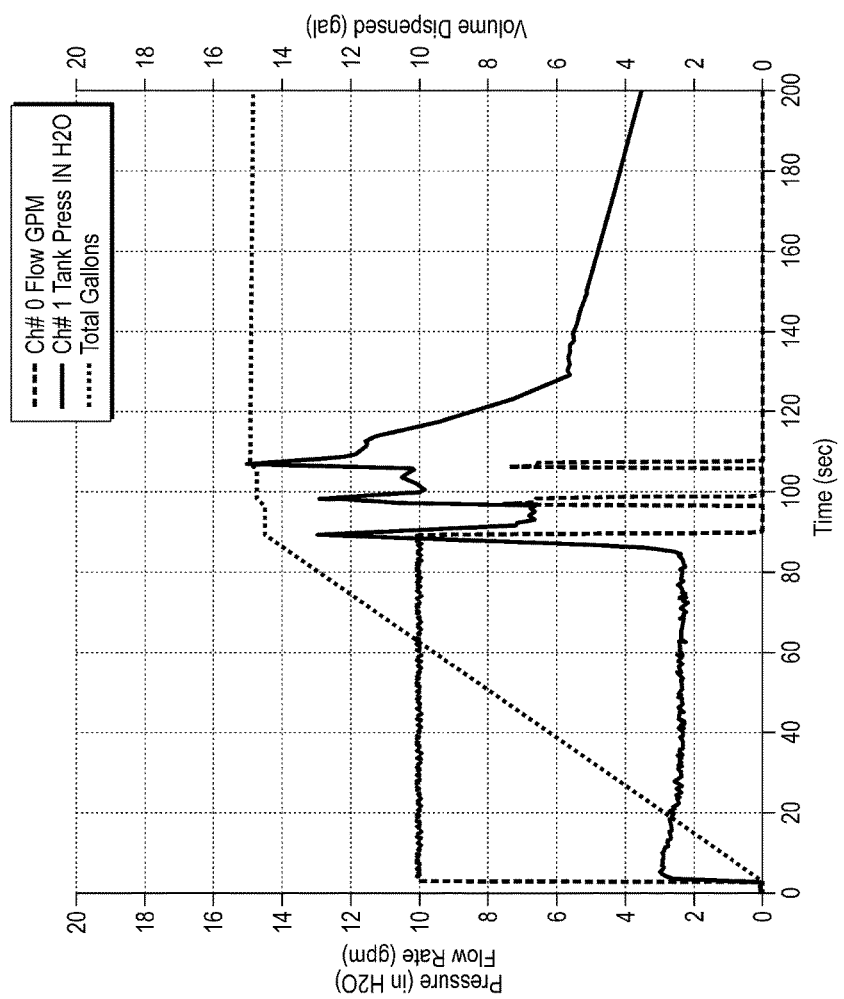
FIG. 3 illustrates an example graph of fuel tank pressure over time.

FIG. 3 illustrates a graph of fuel tank pressure and fuel level over time for various situations. As is indicated by the chart, a typical refuel may recognize a gradual pressure increase with a fuel level (represented by volume) increase until the fueling is complete. At this point, the pressure and volume may stabilize. In a situation where the refuel button 128 may have been erroneously selected, the fuel tank pressure and fuel level may not increase.

Accordingly, disclosed herein is a system for monitoring the pressure and fuel level of a fuel tank to determine whether a refuel button may have been erroneously selected to avoid disruption to the HV charging that is shut off to permit refueling.

Computing devices such as the controllers of the PCM and BCM described herein generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, Matlab Simulink, TargetLink, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, EEPROM (Electrically Erasable Programmable Read-Only Memory and is a type of non-volatile memory used in computers and other electronic devices to store small amounts of data that must be saved when power is removed, e.g., calibration tables or device configuration) optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc., described herein, it should be understood that, although the steps of such processes, etc., have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A hybrid vehicle evaporation system, comprising:
    a fuel tank having a fuel level sensor;
    a refuel button; and
    a controller programmed to
        disable HV charging in response to a selection of the refuel button,
        monitor a fuel level received from the fuel level sensor, and enable HV charging in response to the fuel level failing to increase for a predetermined amount of time following the selection of the refuel button.

2. The system of claim 1, further comprising a fuel door and pressure sensor arranged on the fuel tank, the pressure sensor configured to provide a fuel tank pressure to the controller.

3. The system of claim 2, wherein the controller is further programmed to monitor the fuel tank pressure and enable HV charging in response to the fuel level failing to be greater than zero for the predetermined amount of time.

4. The system of claim 1, further comprising an isolation valve arranged on the fuel tank to release vapor from the fuel tank into a canister, wherein the controller is further programmed to open the isolation valve in response to the selection of the refuel button.

5. The system of claim 1, wherein the refuel button is a button or an interface on a mobile device.

6. A hybrid vehicle, comprising:
a charging system;
a fuel tank having a fuel level sensor; and
a controller programmed to
disable the charging system in response to receipt of a refueling indicator;
monitor a fuel level received from the fuel level sensor; and
enable the charging system responsive to the fuel level failing to increase for a predetermined amount of time following the receipt of the refueling indicator.

7. The vehicle of claim 6, wherein enabling the charging system includes permitting a battery of the vehicle to be charged.

8. The vehicle of claim 6, further comprising a fuel door and pressure sensor arranged on the fuel tank, wherein the pressure sensor is configured to provide a fuel tank pressure to the controller.

9. The vehicle of claim 8, wherein the controller is further programmed to monitor the fuel tank pressure and enable the charging system responsive to the fuel level failing to be greater than zero for the predetermined amount of time.

10. The vehicle of claim 6, further comprising an isolation valve arranged on the fuel tank to release vapor from the fuel tank into a canister, wherein the controller is further programmed to open the isolation valve responsive to receipt of the indicator.

11. A method, comprising:
receiving a selection of a refuel button;
monitoring a fuel level received from a fuel level sensor within a fuel tank; and
enabling a charging system in response to the fuel level failing to increase for a predetermined amount of time following the selection of the refuel button.

12. The method of claim 11, further comprising:
receiving a fuel tank pressure from a pressure sensor at the fuel tank;
monitoring the fuel tank pressure received from the pressure sensor; and
enabling the charging system in response to the fuel tank pressure failing to increase for the predetermined amount of time.

13. The method of claim 11, further comprising:
instructing the charging system to suspend vehicle charging;
instructing, in response to receiving a selection of the refuel button, an isolation valve to open to depressurize a fuel tank; and
instructing a fuel door to unlock.

\* \* \* \* \*